United States Patent [19]
Irie

[11] Patent Number: 5,492,464
[45] Date of Patent: Feb. 20, 1996

[54] TIRE VULCANIZING PRESS

[75] Inventor: Nobuhiko Irie, Nagasaki, Japan

[73] Assignee: Mitsubishi Jukogyo Kabushiki Kaisha, Tokyo, Japan

[21] Appl. No.: 357,135

[22] Filed: Dec. 15, 1994

Related U.S. Application Data

[63] Continuation of Ser. No. 7,896, Jan. 22, 1993, abandoned.

[30] Foreign Application Priority Data

Jan. 24, 1992 [JP] Japan ..................... 4-011121

[51] Int. Cl.⁶ ................ B29C 35/02; B29D 30/06
[52] U.S. Cl. ............. 425/34.1; 425/38; 425/46; 425/47
[58] Field of Search ................ 425/28.1, 35, 38, 425/46, 47, 34.1

[56] References Cited

U.S. PATENT DOCUMENTS

| | | | |
|---|---|---|---|
| 3,082,480 | 3/1963 | Ballé | 425/46 |
| 3,460,197 | 8/1969 | Cantarutti et al. | 425/46 |
| 3,776,999 | 12/1973 | Leblond | 425/46 |
| 3,833,323 | 9/1974 | Pasch | 425/46 |
| 3,850,555 | 11/1974 | Pasch | 425/46 |
| 3,852,006 | 12/1974 | Irie | 425/46 |
| 3,910,735 | 10/1975 | Caretta | 425/46 |
| 4,022,554 | 5/1977 | MacMillan | 425/46 |
| 4,181,482 | 1/1980 | Grawey et al. | 425/46 |
| 4,871,305 | 10/1989 | Galigani | 425/35 |
| 5,015,165 | 5/1991 | Ozaki et al. | 425/34.1 |
| 5,165,939 | 11/1992 | Pizzorno | 425/34.1 |
| 5,208,044 | 5/1993 | Miyata et al. | 425/46 |

FOREIGN PATENT DOCUMENTS

| | | | |
|---|---|---|---|
| 0170109 | 2/1986 | European Pat. Off. | |
| 1524848 | 4/1968 | France | 425/46 |
| 2163750 | 7/1973 | France | |
| 1917081 | 10/1970 | Germany | |
| 2513781 | 10/1975 | Germany | |
| 57-182415 | 11/1982 | Japan | 425/46 |
| 2-127409 | 10/1990 | Japan | |
| 3-132306 | 6/1991 | Japan | |

*Primary Examiner*—James P. Mackey
*Attorney, Agent, or Firm*—Birch, Stewart, Kolasch & Birch

[57] ABSTRACT

A tire vulcanizing press of the present invention uses a split die device having an upper disk to which an upper die portion for molding the tire side is attached, a lower disk to which a lower die portion for molding the tire side is attached, divided segments to which a split tread die portion for molding the tire tread is attached, and an outer ring which has an inner inclined surface corresponding to the outer inclined surface of the segment and are slidably engaged with the outer inclined surface. Each of the divided segments has protrusions at the upper part and the lower part so that outward forces applied to the die portions during vulcanization are received by the protrusions of the segments.

6 Claims, 11 Drawing Sheets

TIRE VULCANIZING PRESS

This application is a continuation of application Ser. No. 08/007,896 filed on Jan. 22, 1993, now abandoned.

BACKGROUND OF THE INVENTION

1. Field of the Invention

The present invention relates to a tire vulcanizing press and a split die device for vulcanizing tires mounted to vehicles.

2. Description of Related Art

In vulcanizing a tire, a heating medium of high temperature and high pressure (steam, steam plus inert gas, or warm water) is admitted into the inside of a tire, so that the die tends to be opened by the pressure of the heating medium. Since crude rubber is softened by the increase in temperature, in the event of opening of die, not only does the tire being vulcanized becomes defective, but also the heating medium blows off through the tire. For this reason, the tire vulcanizing machine is so constructed that the die is incorporated in the crank press or liquid pressure press to prevent the die from opening by pressing the die during vulcanization of tire. Therefore, the main frame or other structures must withstand this pressing force, which makes the machine heavy and expensive.

An example of a conventional tire vulcanizing machine will be briefly explained with reference to FIGS. 10 through 12. In these figures, right and left of line G—G, H—H, and I—I indicate the cases where the die thickness is different. Reference numeral 101 denotes a main frame, which can vulcanize two tires at the same time. Reference numeral 102 denotes a container incorporating a die split into a plurality of parts, 103 denotes a bolster plate which attaches to the die and raises and lowers it, 104 denotes an upper center mechanism incorporating a tire centering mechanism, 3 denotes a lower center mechanism including a bladder operating mechanism and a passage for admitting a tire inside heating medium into the bladder, 105 denotes a die thickness adjusting cap connected to the upper center mechanism with screws, 106 denotes a pressurizing cylinder, 107 denotes rails for moving the pressurizing cylinder when the die is opened to set or remove a tire, 108 denotes a liquid pressure cylinder for raising and lowering the bolster plate 103, 8 denotes a loader for loading a crude tire, and 9 denotes an unloader for unloading the vulcanized tire. Even for vulcanizing passenger car tires, the pressurizing cylinder must deliver an output of about 130 tons per tire. Therefore, the main frame 101, the upper center mechanism 104, and other members must withstand this output.

As another type of machine, the technology in which upper and lower clamp domes 45, 46 are connected and released by a lock ring 48 has been proposed as disclosed in Japanese Patent Laid-Open No.132306/1991. With this technology, the upper and lower clamp domes 45, 46, the lock ring 48, and other members must withstand the above-described pressing force, which requires a high cost. In vulcanizing a tire, a heating medium of high pressure (for example, 25 kg/cm$^2$) is admitted into the inside of a crude tire (into the molding bladder 2 in Japanese Patent Laid-Open No.132306/1991) after the die is closed. Therefore, the upper and lower side dies tend to be opened by the inside pressure reaction. For the tread die, the radial inside pressure reaction changes the direction of force on the slope of an outer ring, so that the outer ring tends to open in the same direction as that of the side dies. Therefore, the die must be closed by overcoming the resultant force of these inside pressure reactions. For this purpose, the presses disclosed in FIG. 10 and Japanese Patent Laid-Open No.132306/1991 are equipped with a die clamping mechanism having a strength greater than the inside pressure reaction on the press body side.

Figure 10:
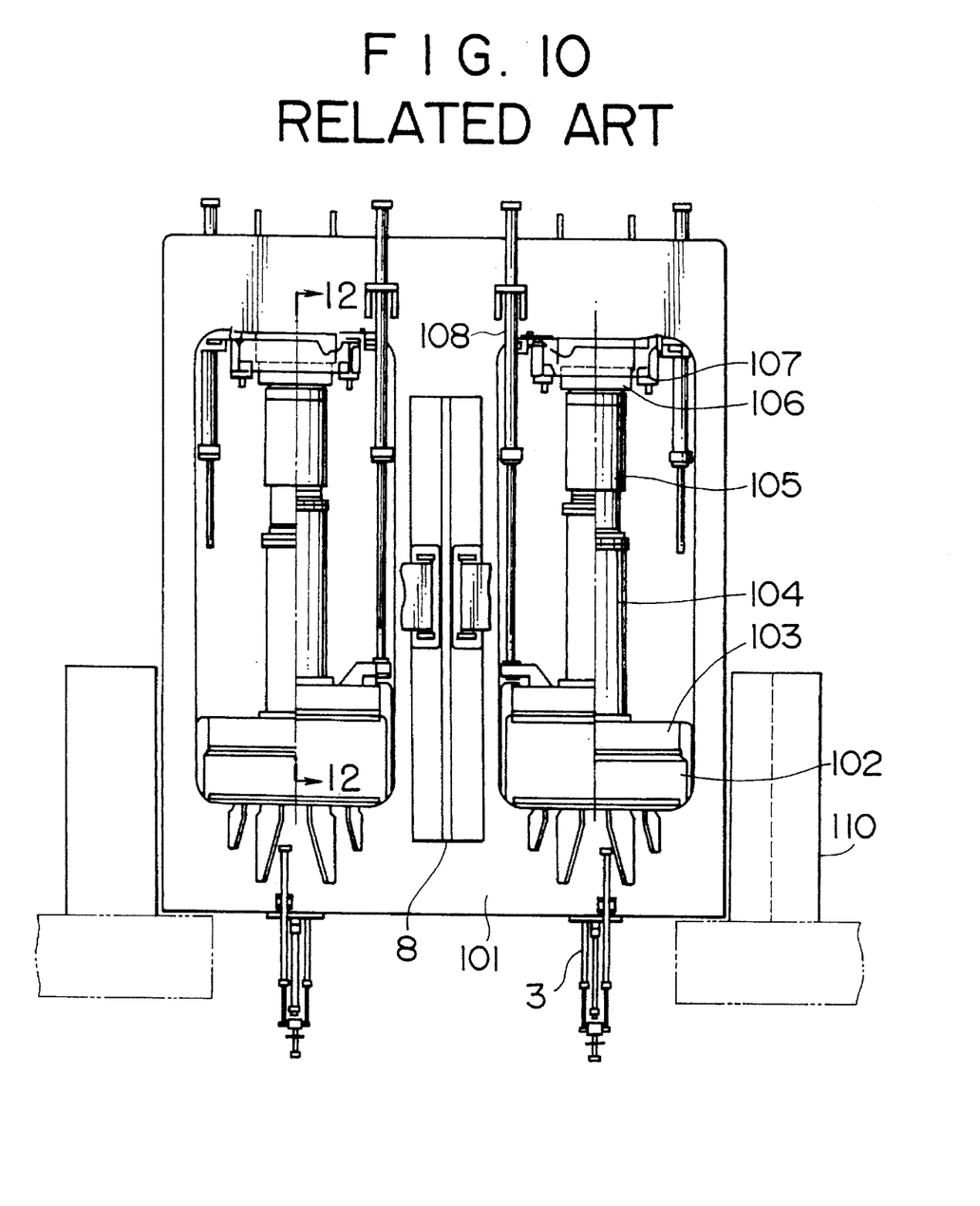
FIG. 10 is a front view of a conventional tire vulcanizing machine.
Figure 11:
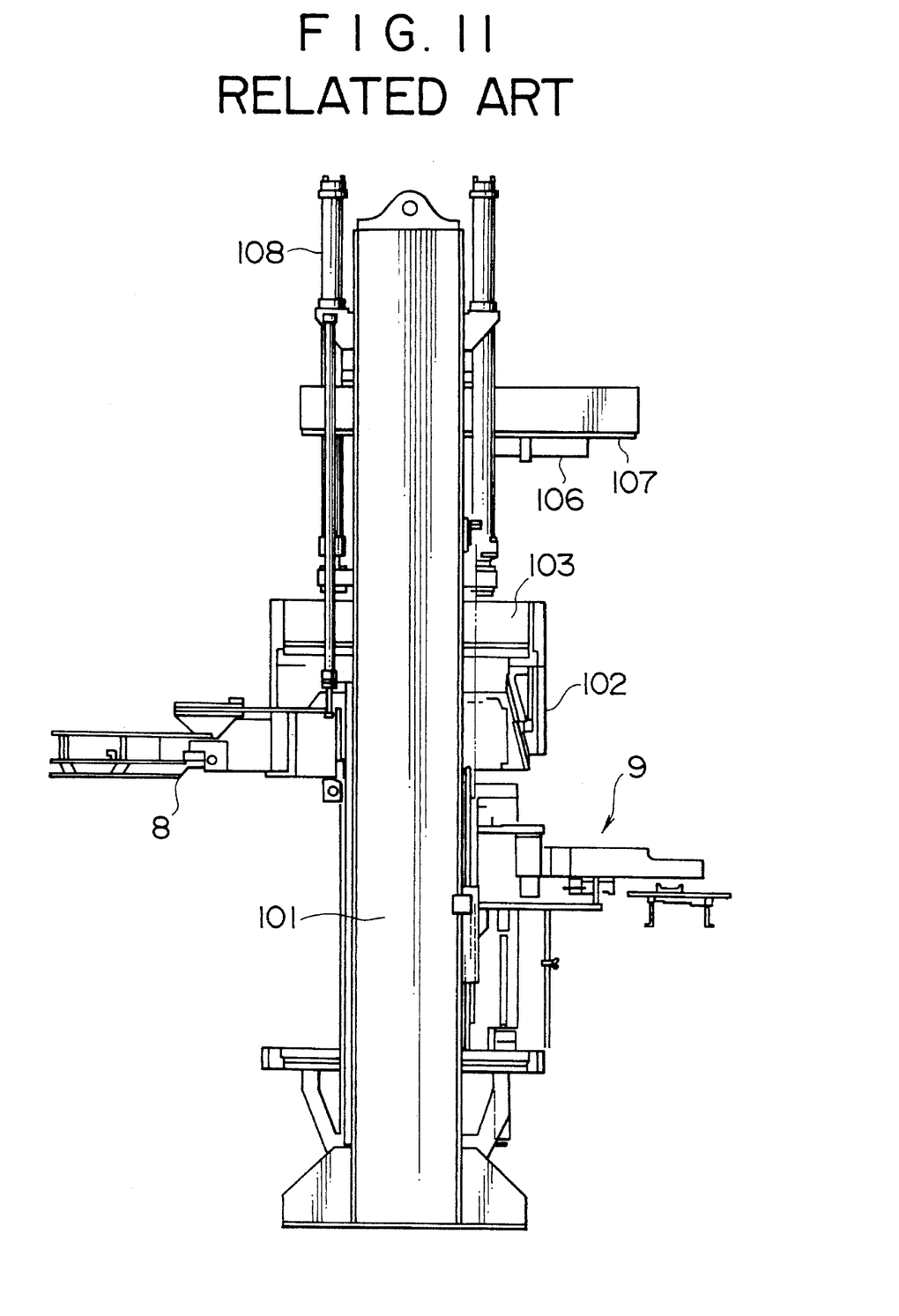
FIG. 11 is a side view of the machine shown in FIG. 10.
Figure 12:
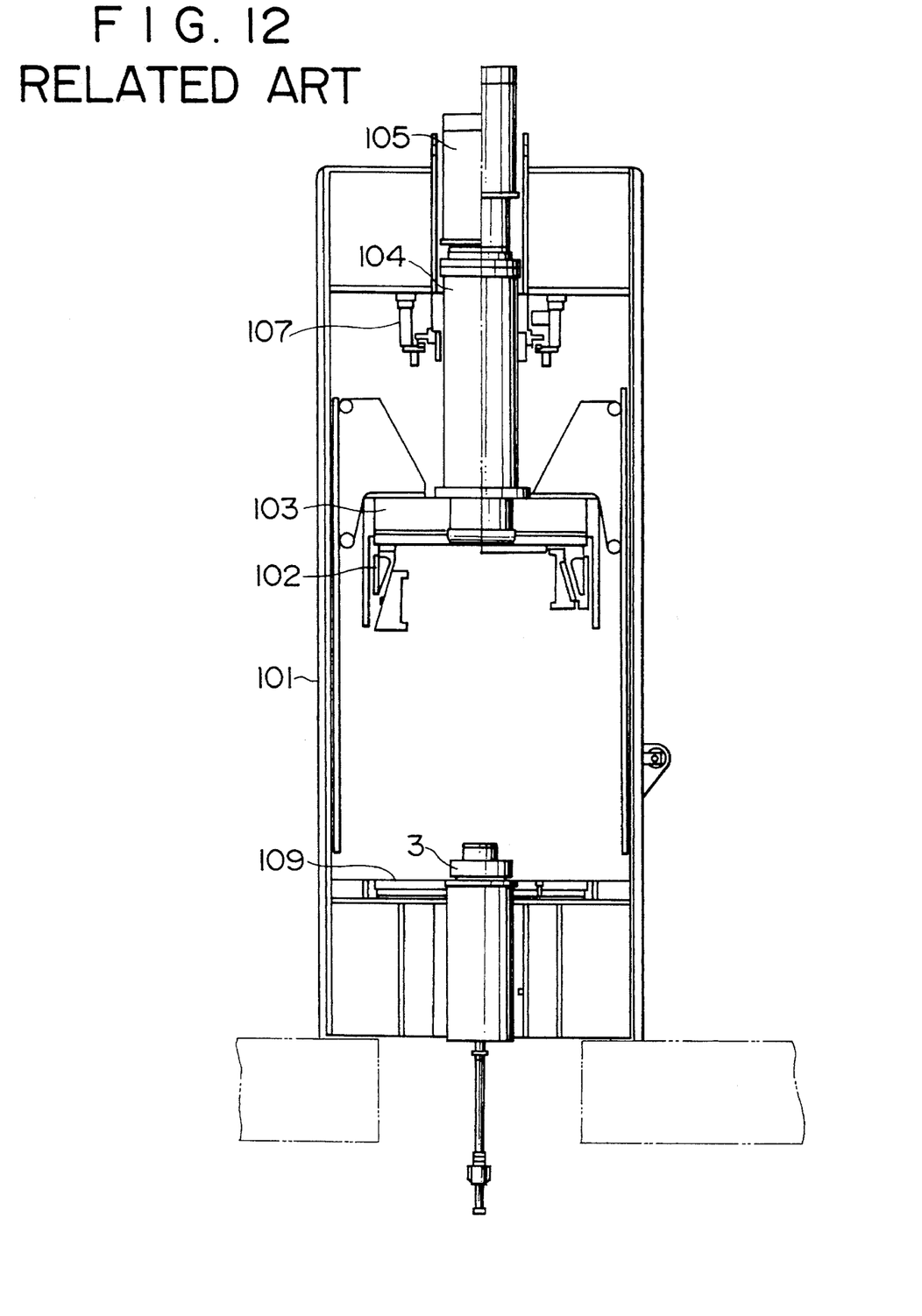
FIG. 12 is a sectional view taken along the line 12—12 of FIG. 10.

The tire vulcanizing machine shown in FIGS. 10 through 12 has a guide bracket installed at each side of bolster plate for attaching the die and transmitting the die clamping force, a square rail installed inside a portal frame disposed at each side of the bolster plate, and a plurality of rollers installed so as to grip the square rail from three directions (the rollers are incorporated into the guide bracket). The rollers can be adjusted in relation to the square rail by means of an eccentric bushing which can make adjustment so that the gap is zero or a pre-load is given in the entire process in which the bolster plate is raised and lowered. Near the circular peripheral end of the bolster plate, the rod end of the elevating cylinder disposed diagonally is connected, and the cylinder is mounted at an appropriate place at the upper part of the frame. With such a die opening/closing mechanism, the bolster plate can be vertically guided exactly along the square rail by means of the elevating cylinder, and the bolster plate can be raised or lowered while being kept horizontal against the imbalance of the thrust of the elevating cylinder.

However, the tire vulcanizing machine shown in FIGS. 10 through 12 has the following problems:

(1) The adjustment of rollers using the eccentric bushing requires high technique.

(2) The adjusting work must be done regularly after the initial adjustment.

(3) Even if the elevating cylinders are manufactured with high accuracy, a difference in cylinder output is produced after long-term operation by the internal leakage or the relative difference in piston packing resistance due to aging, producing an inclination or vibration of the bolster plate.

By using the device disclosed in Japanese Utility Model Laid-Open No.127409/1990, that is, a straight track bearing commercially available as a finished product, the work for adjusting the roller gap may be lessened, and the problem of inclination or vibration of bolster plate due to the difference in output of the elevating cylinder may be solved.

However, the device in Japanese Utility Model Laid-Open No.127409/1990 has the following problems:

(1) Because the elevating cylinders are located at positions far apart from the center of die.

(a) The guide bracket must be rigid since it is subjected to a moment due to a shaping reaction (molding reaction in pre-expansion) acting at the die center as a resultant force in the process in which the die is closed.

(b) A moment due to bonding force between the tire and the die acting at the die center as a resultant force occurs in the direction opposite to the moment of (a) in the process in which the die is opened. This also requires high rigidity of the guide bracket.

(c) The press should be operated as fast as possible from the viewpoint of productivity; while a low speed is required in the process of pre-molding and the process in which the tread die is opened, that is, the process in which the tire tread is separated from the tread die. In this speed change from high to low speed and in a sudden stop for emergency to prevent an accident, a very high inertia force is produced near the die center because a position near the die center is the center of gravity, by which a moment is produced at the guide bracket.

When the device disclosed in Japanese Utility Model Laid-Open No.127409/1990 is used practically, therefore, the guide bracket must be considerably rigid, and a considerably large straight track bearing must be used; an economical opening/closing mechanism cannot be provided.

(2) A vulcanizing press requires an apparatus for loading a crude tire and that for unloading a finished tire. For the arrangement and installation of these apparatuses, Japanese Utility Model Laid-Open No.127409/1990 is not suitable. The reason for this is as follows: Because the frame of the opening/closing guide is positioned outside the press, (a) The tire loading apparatus and the tire unloading apparatus must be separated at right and left, that is, they must be near the frame. This runs counter to the aim of providing an economical press which is operated with right and left simultaneous operation cycle.

(b) If the tire loading apparatus and the tire unloading apparatus are positioned at the center of right and left dies to solve the problem of (a), a rigid column is needed for the tire loading apparatus and the tire unloading apparatus in addition to the frame. This also runs counter to the aim of providing an economical machine.

(c) Since the frame is positioned outside, an auxiliary means, for example, to connect both frame columns at the top to increase the rigidity of the guide frame is needed. This is objectionable in pursuing economy.

Although the conventional vulcanizing machine described above is so constructed that any of a split die and a vertically two-piece die which are known in the industry can be used, almost all machines have recently used the split die because the demand for higher quality and performance of the radial ply tire has increased. Regarding a vulcanizing press using a split die only, U.S. Pat. No. 4,871,305 has been known.

However, this U.S. Patent has the following problems:

(1) Although the tread molding die is changeable, a segment for attaching the die, a guide for opening/closing the segment, and an opening/closing drive mechanism are integral parts of structure of the vulcanizing press. Therefore, the tread molding die can be changed only on the press, so that the operation for production must be stopped during the die change; efficient die change cannot be performed.

(2) The upper and lower side dies must be changed independently.

(3) Since the die is heated usually to a temperature as high as 150° C. or higher in use, the work for changing the die in the press is dangerous. Accordingly, the work efficiency is decreased.

(4) Since the replacement die is cold, it must be heated to the temperature in use after troublesome and inefficient change work. Therefore, the machine cannot be used for several hours after the die change. When a wide variety of tires of different sizes and patterns are produced, the frequency of die change becomes high, which decreases the productivity, whereby the producer suffers a serious disadvantage.

To solve the above problems, many producers are exerting their ingenuity for fast changing of split die device and quick start-up of production by changing the die including the opening/closing mechanism (every split die device usually called a sectional mold container) which has been preheated, while strongly demanding the automation of die attaching/detaching work to a press. For this reason, the vulcanizing press of U.S. Pat. No. 4,871,305 cannot be said to be suitable for efficient die change.

OBJECT AND SUMMARY OF THE INVENTION

An object of the present invention is to provide a tire vulcanizing press in which an upper and lower side wall dies and split tread dies installed in a split die device can be changed as assembled in the split die device, and a force produced by the high pressure in the tire (a force to tend to open the die) can be confined in the die device itself.

(1) To this end, the tire vulcanizing press of the present invention uses a split die device having an upper disk to which an upper die portion for molding the tire side is attached, a lower disk to which a lower die portion for molding the tire side is attached, divided segments to which a split tread die portion for molding the tire tread is attached, and an outer ring which has an inner inclined surface corresponding to the outer inclined surface of the segment and are slidably engaged with the outer inclined surface. Each of the divided segments has protrusions at the upper part and the lower part, so that the protrusions engage with the outer peripheries of the upper and lower disks to lock the upper and lower disks to prevent the disks from separating when the die is closed. When the die is opened and the segments move outward, the locking condition is released, by which the upper die portion and the lower die portion are separated to receive a crude tire. After the die is closed, the separating action of upper and lower disks generated when a pressurized heating medium is admitted into the inside of the tire is inhibited by the segments, whereby the transmission of internal reaction to the press body is minimized.

(2) The outer ring is fixed to a bolster plate which is in a fixed relation to a center mechanism operating cylinder, the segments are supported by the upper disk which is in a fixed relation to a piston rod of the center mechanism operating cylinder in such a manner as to slide horizontally.

(3) A column for attaching guide rails for opening/closing the die is disposed at the intermediate portion between the right and left dies. This column is also used as a column for the guide rails for the crude tire loading apparatus and the finished tire unloading apparatus.

(4) The column at the intermediate portion is of a T shape when viewed from the front, and elevating cylinders are disposed at positions slightly offset from the die center to the guide bracket side, preferably near the center of gravity of the entirety of the guide bracket and the elevating plate.

(5) When a pressurized heating medium is admitted into the inside of tire after the die is closed, the divided segment is subjected to internal pressure reaction in the radial outward direction. This internal pressure reaction is converted into a vertical reaction by the slope effect of an annular body of the split die device (though the reaction is lessened by friction), which tends to raise the elevating disk and the annular body. To resist this tendency, a downward force is always produced on the elevating cylinder. With the hydraulic upright-type press, the elevating cylinders for opening/closing the die is in a free condition during vulcanization.

(6) In the case of (5), the die opens if the elevating cylinder or the circuit fails, which is undesirable. As an alternative or a second safety measure, a split die opening/closing operation cylinder is used. That is, the cylinder disposed at the die center portion is mounted to the bolster plate, and the rod side is connected to the upper disk of the split die device. This split die opening/closing operation cylinder is operated in the direction in which the rod is pulled up during vulcanization, so that the upper disk and the bolster plate are pulled, by which the die closing condition is kept.

(7) As another alternative of (5) and (6), a mechanism for preventing the die from opening, which engages with the groove on the annular body side of the split die device, is installed at the lower base of the press.

(8) As another method of (7), a mechanism for preventing the die from opening, which engages with the rod of the split die operation cylinder when die is closed, is installed at the bolster plate portion.

With the tire vulcanizing press of the present invention, when the die is closed, the forces to tend to open the die, which are produced by the high pressure in the tire, are balanced in the die device itself, which eliminates the need for the die clamping mechanism of high output and the strength members conventionally required.

The upper and lower side wall dies and split tread dies installed in a split die device can be changed as they are assembled in the split die device. In addition, the decrease in clamping force improves the accuracy of the opening/closing mechanism, by which the opening/closing operation becomes smooth.

Therefore, the tire vulcanizing press of the present invention uses a split die device having an upper disk to which an upper die portion for molding the tire side is attached, a lower disk to which a lower die portion for molding the tire side is attached, divided segments to which a split tread die portion for molding the tire tread is attached, and an outer ring which has an inner inclined surface corresponding to the outer inclined surface of the segment and are slidably engaged with the outer inclined surface, in which each of the divided segments has protrusions at the upper part and the lower part, the protrusions engage with the outer peripheries of the upper and lower disks to lock the upper and lower disks to prevent the disks from separating when the die is closed, and the locking condition is released, by which the upper die portion and the lower die portion can be separated when the die is opened and the segments move outward. This constitution offers the following effects:

(1) The forces which to tend to open the die, which are produced by the action of pressurized heating medium admitted into the inside of tire via a bladder, are balanced in the split die device.

(2) As a result of (1), a pressurizing cylinder of high pressure and high output which was required in the conventional machine can be omitted.

(3) Since the pressure reaction acting on the main frame is eliminated, the weight of the main frame can be significantly reduced, and the construction of the main frame can be simplified.

(4) The die can be changed by the same procedure as that of the conventional multi-split die.

(5) The need for the device for adjusting the die thickness can be eliminated.

If the outer ring is fixed to a bolster plate which is in a fixed relation to a center mechanism operating cylinder, the segments are supported by the upper disk which is in a fixed relation to a piston rod of the center mechanism operating cylinder in such a manner as to slide horizontally, the die can be opened/closed by means of the center mechanism operating cylinder, which eliminates the need for the dedicated cylinder. As a result, the device can be made simple and can be manufactured at low cost.

DETAILED DESCRIPTION OF PREFERRED EMBODIMENTS

The First Embodiment

A first embodiment of the present invention will be described with reference to FIGS. 1 through 6.

Figure 1:
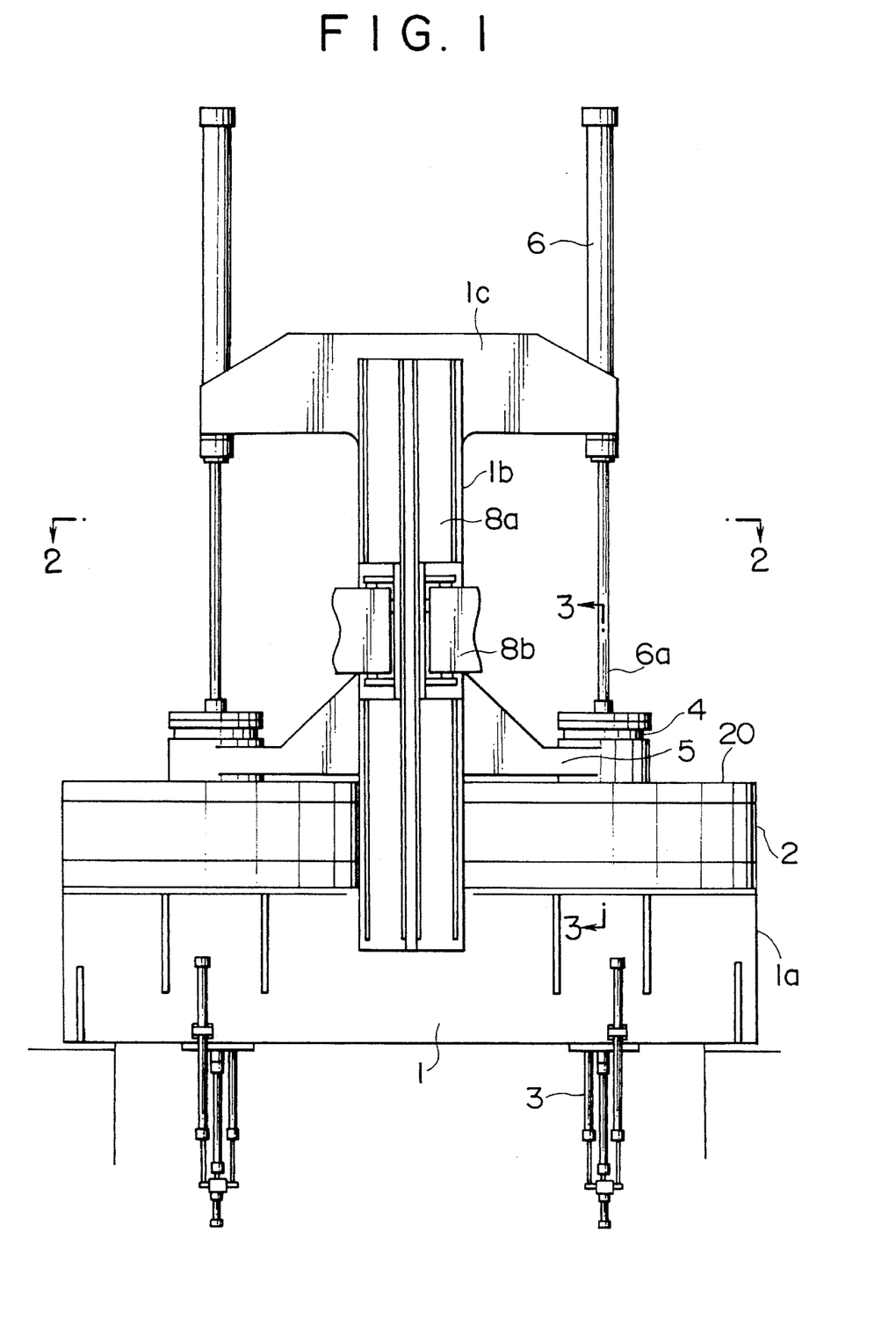
FIG. 1 is a front view of a first embodiment of a tire vulcanizing press in accordance with the present invention.
Figure 2:
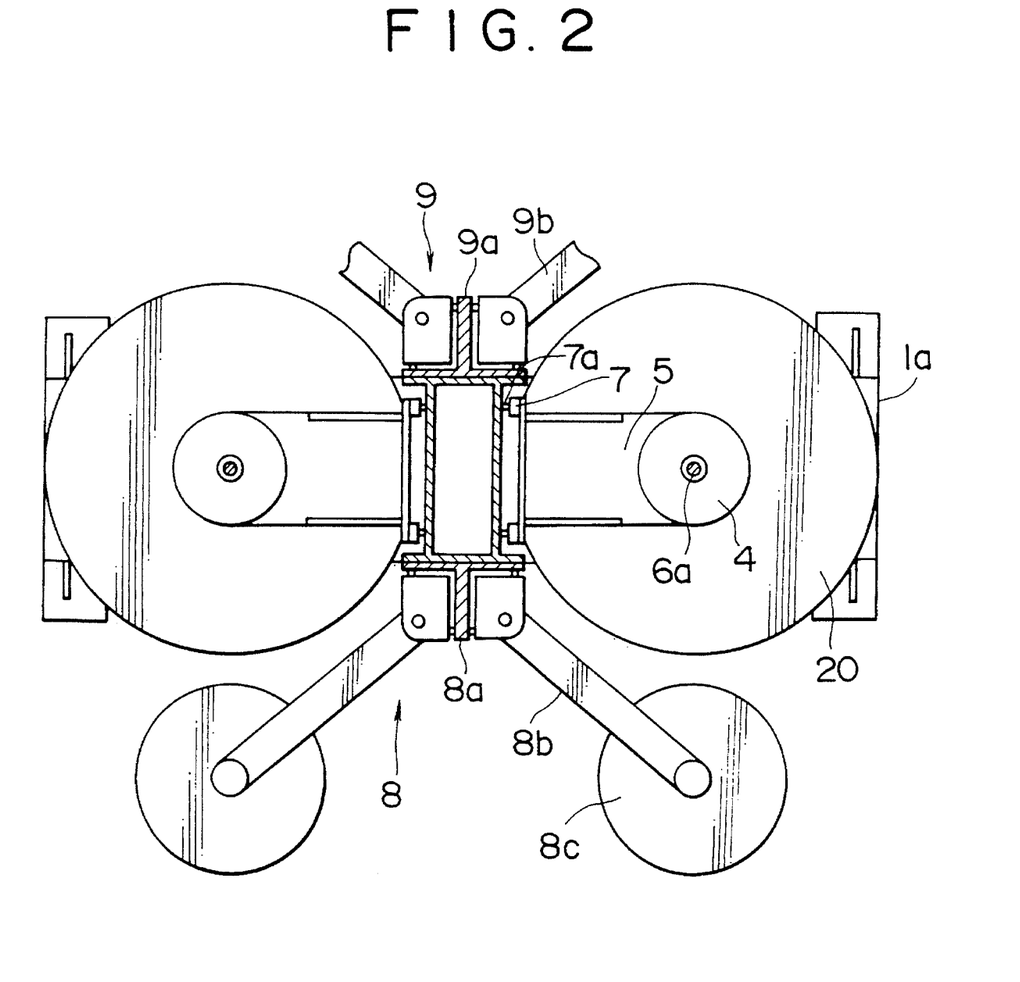
FIG. 2 is a sectional view taken along the line 2—2 of FIG. 1.
Figure 3:
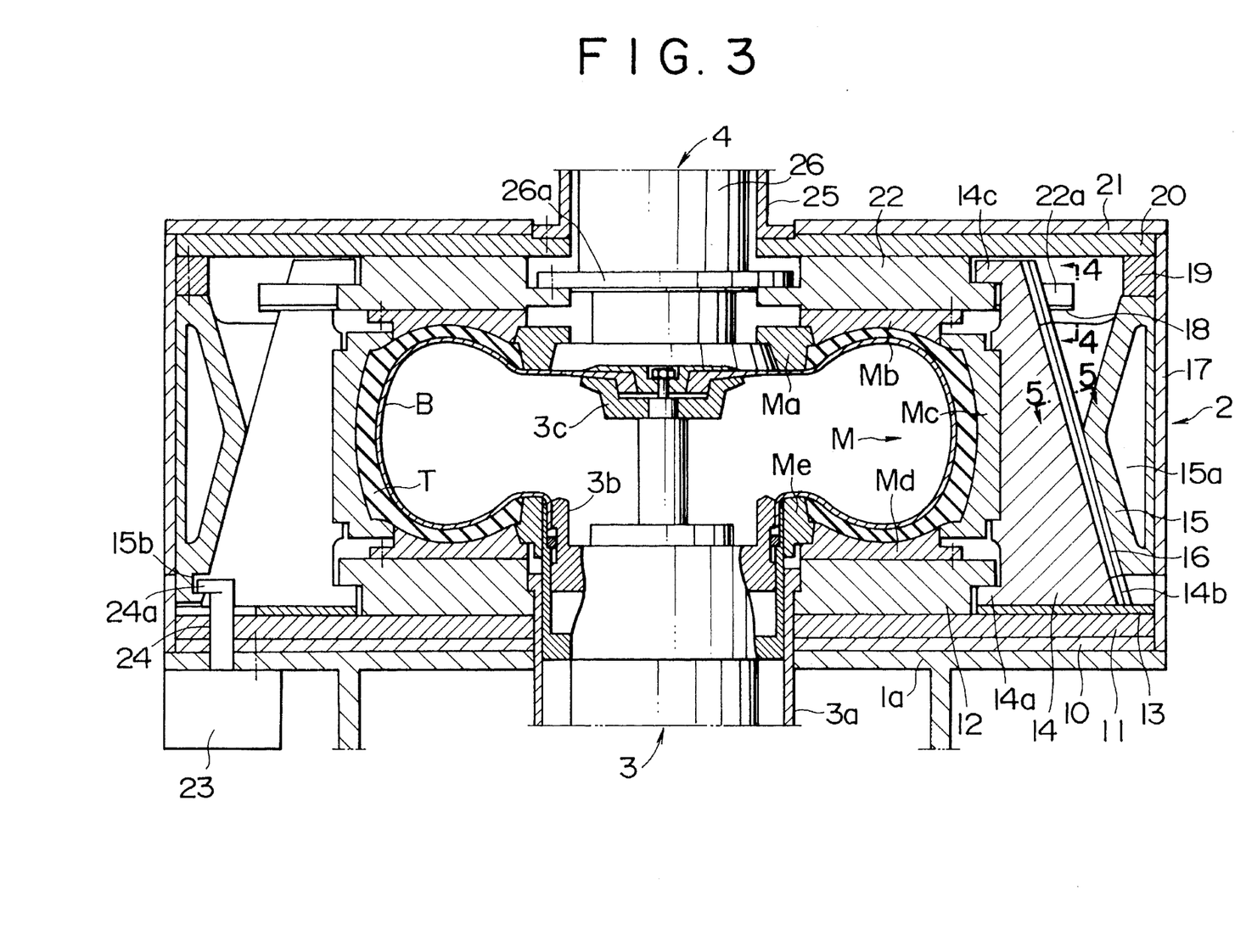
FIG. 3 is a sectional view taken along the line 3—3 of FIG. 1.

Reference numeral 1 denotes a main frame, 2 denotes a split die device incorporating later-described dies, 20 denotes a bolster plate for attaching the upper die portion of the split die device, 3 denotes a publicly known lower center mechanism including a passage for admitting a pressurized heating medium into the inside of a tire T via a bladder B and a bladder operating mechanism for putting the bladder B into and out of the inside of tire T, 4 denotes a later-described upper center mechanism including a publicly known head block 26 incorporating a tire centering mechanism, 5 denotes a bracket for fixing the upper center mechanism 4. The bracket 5 is installed to the column 1b of the main frame 1 via straight track bearings 7 and rails 7a in such a manner as to be freely movable vertically. To the bracket 5 is fixed the bolster plate 20. A piston rod 6a of a cylinder 6 fixed to the beam 1c of the main frame 1 is connected to the top end of the upper center mechanism 4. By the action of the cylinder 6, the split die device 2, the upper center mechanism 4, the bracket 5, and the bolster plate 20 moves up and down.

Reference numeral 8 denotes a publicly known crude tire loading apparatus assembled in front of the column 1b of the main frame 1, which comprises an elevation guide frame 8a, a swing arm 8b, and a crude tire gripping basket 8c. Reference numeral 9 denotes a publicly known vulcanized tire unloading apparatus assembled to a rear of the column 1b of the main frame 1, which comprises an elevation guide frame 9a, a swing arm 9b, and a vulcanized tire gripping basket (not shown).

Next, the split die device 2 will be described. To the upper surface of the base 1a of the main frame 1, a bottom plate 11 is fixed via a heat insulating plate 10. To the upper surface of the bottom plate 11, a lower disk 12 and a guide plate 13 are fixed coaxially. To the upper surface of the lower disk 12, a lower side wall die Md of the die M is fixed. To the inside of the lower side wall die Md, a lower bead ring Me is fixed.

On the other hand, an upper center mechanism 4 is fixed to the bolster plate 20. To an upper disk 22 fixed to a flange 26a of the head block 26 in the upper center mechanism 4, an upper side wall die Mb is fixed. To the inside of the upper side wall die Mb, an upper bead ring Ma is fixed. From an arm 22a extending radially outward from the upper disk 22, segments 14 are slidably hung in the radial direction. To the inner surface of the segment 14 is fixed a tread die Mc which is circumferentially divided into a plurality of parts. When the segments 14 are in the inward position, pawls 14c, 14a disposed at the upper and lower portions of the segment engage with flanges disposed at the periphery of the upper and lower disks 22, 12, respectively, and all parts of the die M are closed and connected to form the outer surface of tire T.

Figure 4:
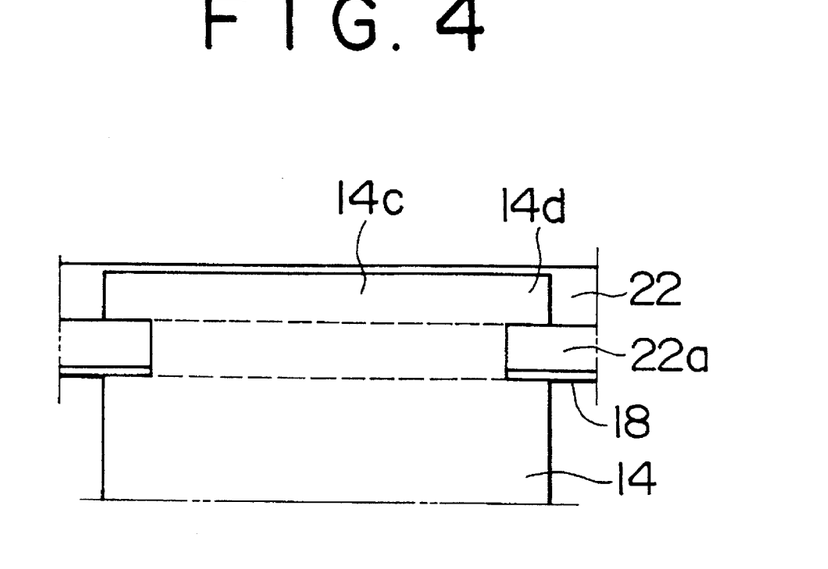
FIG. 4 is a sectional view taken along the line 4—4 of FIG. 3.
Figure 5:
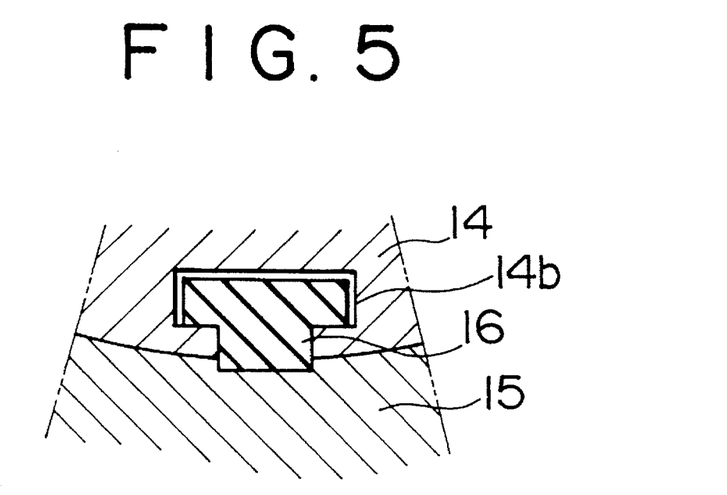
FIG. 5 is a sectional view taken along the line 5—5 of FIG. 3.
Figure 6:
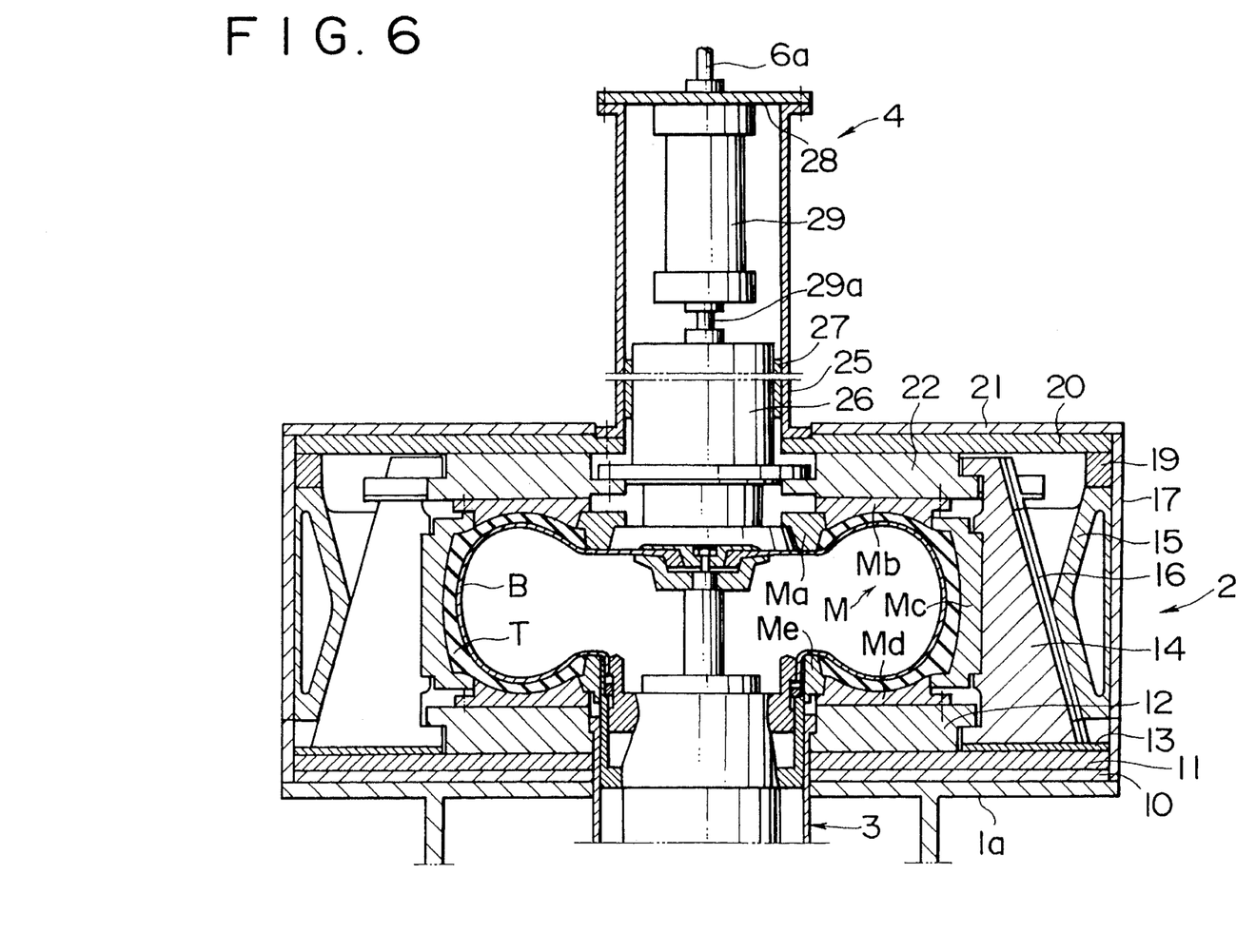
FIG. 6 is a sectional view taken along the line 3—3 of FIG. 1, showing an embodiment different from FIG. 3.

To the inner inclined surface of an outer ring 15 slidably engaging with the outer inclined surface of the segment 14, a T block 16 is fixed. The T block 16 is inserted in a T groove disposed on the outer inclined surface of the segment 14, so that the outer ring 15 and the segment 14 slide relatively in the axial direction. By this sliding movement, the segment 14 moves inward in the radial direction. Reference numeral 18 denotes a sliding material attached to the lower surface of the arm 22a of the upper disk 22. The outer ring 15 is fixed to the outer part of the lower surface of the bolster plate 20 via a spacer ring 19.

The upper center mechanism 4 is formed by connecting the block head 26 sliding by the guide of a bushing 27 fixed to the inner peripheral surface of the outer cylinder 25 to the tip of a piston rod 29a of a cylinder 29 fixed to the outer cylinder 25 via a top plate 28. By the action of the cylinder 29, the segment 14 and the outer ring 15 slide in the axial direction. In this embodiment, though not shown in the figures, to provide a platen-type tire vulcanizing machine, the upper and lower disks 22, 12 are used as hot plates by installing steam passages in the disks, and a steam chamber 15a is disposed in the outer ring 15 so that the die M can be heated from the outside. For the purpose of heat insulation, the split die device 2 is covered with heat insulating materials 17, 21. In this embodiment, since a multi-split die is mounted, a force to move the tread die Mc outward is applied by the pressurized heating medium admitted into the inside of tire T via the bladder B. This force is kept by the outer ring 15 via the segment 14. Depending on the inclined angle of the inclined surface between the two elements 14, 15, the component of this force acts in the direction in which the outer ring 15 is pushed up. Therefore, an actuator 23 for rotating and moving a shaft 24 is installed on the lower surface of base 1a of the main frame 1 so that a pawl 24a disposed at the tip of the shaft 24 engages with a groove 15b disposed on the inner surface of the outer ring 15 to prevent the outer ring 15 from being pushed up during vulcanization of tire.

Next, the operation of the tire vulcanizing machine of this embodiment will be described. FIGS. 3 and 4 show the condition during vulcanization of tire. During vulcanization of tire, a pressurized heating medium is admitted into the inside of tire T via the bladder 8. By the action of this pressurized heating medium, a force to open the gap between the upper side wall die Mb and the lower side wall die Md is generated. However, since the upper disk 22 and the lower disk 12 are kept by the pawls 14c, 14a of the segment 14, the upper and lower side wall dies Mb, Md do not open. A force to move the tread die Mc outward is kept by the outer ring 15, and the component of this force tends to push up the outer ring 15. Since this die opening force is relatively low, the die may be kept closed by lowering the elevating cylinder 6 during vulcanization.

During vulcanization of the tire, the die may be kept closed by retracting the cylinder 29 for operating the split die, that is, by integrally keeping the upper disk 22, the bolster plate 20, and the outer ring 15 fixed to the bolster plate 20. If the die is kept closed by the fluid pressure cylinder only, the outer ring 15 is raised the distance corresponding to the stroke of the fluid pressure cylinder in the event that the fluid supply circuit or the fluid pressure cylinder is faulty. Therefore, when it is necessary to limit the opening, the pawl 24a is engaged.

After the completion of vulcanization, the pressurized heating medium is exhausted, and then the pawl 24a is raised and rotated to disengage from the groove 15b. The cylinder 29 is operated in the direction in which the piston rod 29a is pushed out. The output of the cylinder 29 acts on the segment 14 via the head block 26 and the upper disk 22. Since the lower surface of the segment 14 abuts against the guide plate 13, the reaction raises the outer ring 15 via the outer cylinder 25 of the upper center mechanism 4, the bolster plate 20, and the spacer ring 19. Thus, a relative movement is produced between the outer ring 15 and the segment 14, so that the bolster plate 20 separates from the upper disk 22, and the segment 14 is moved outward. The pawls 14a, 14c of the segment 14 are disengaged, so that the tread die Mc is separated from the tire T. Then, the cylinder 6 is operated to raise the split die device 2 together with the upper center mechanism 4, thereby opening the die M.

During this process, bladder clamps 3b, 3c of the lower center mechanism are lowered to pull the bladder B out of the inside of the tire T and store it in an outer cylinder 3a. After the die M is opened, the vulcanized tire is hung and taken out of the split die device by using the tire unloading apparatus. Then, a crude tire to be vulcanized next is hung and set in the split die device 2 by using the tire loading apparatus. The next vulcanizing process is carried out in the order reverse to the above: the bladder is inserted, the die is closed, the outer ring is locked by the action of the actuator 23, and a pressurized heating medium is admitted into the inside of the tire.

The Second Embodiment

Figure 7:
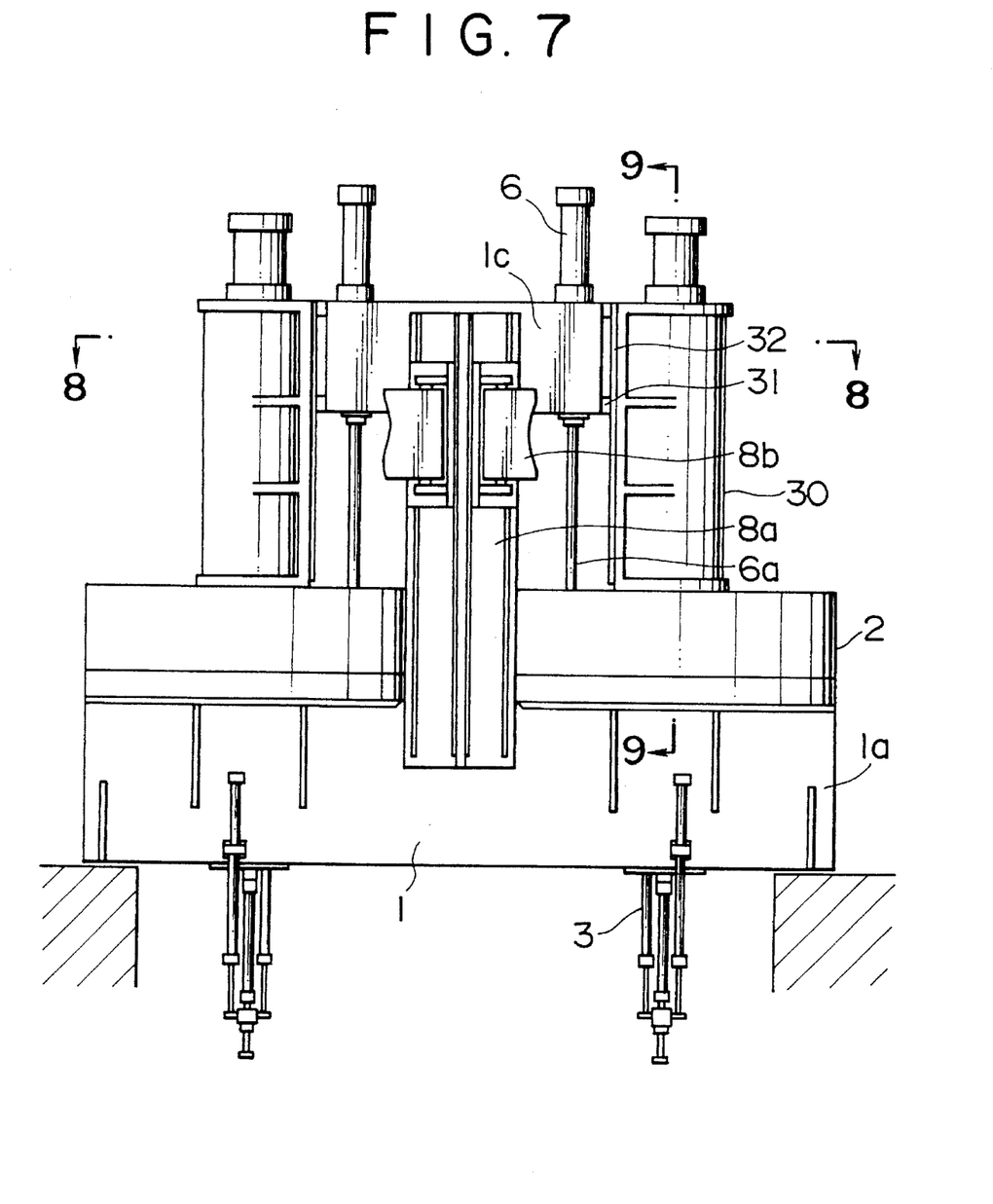
FIG. 7 is a front view of a second embodiment of a tire vulcanizing press in accordance with the present invention.
Figure 8:
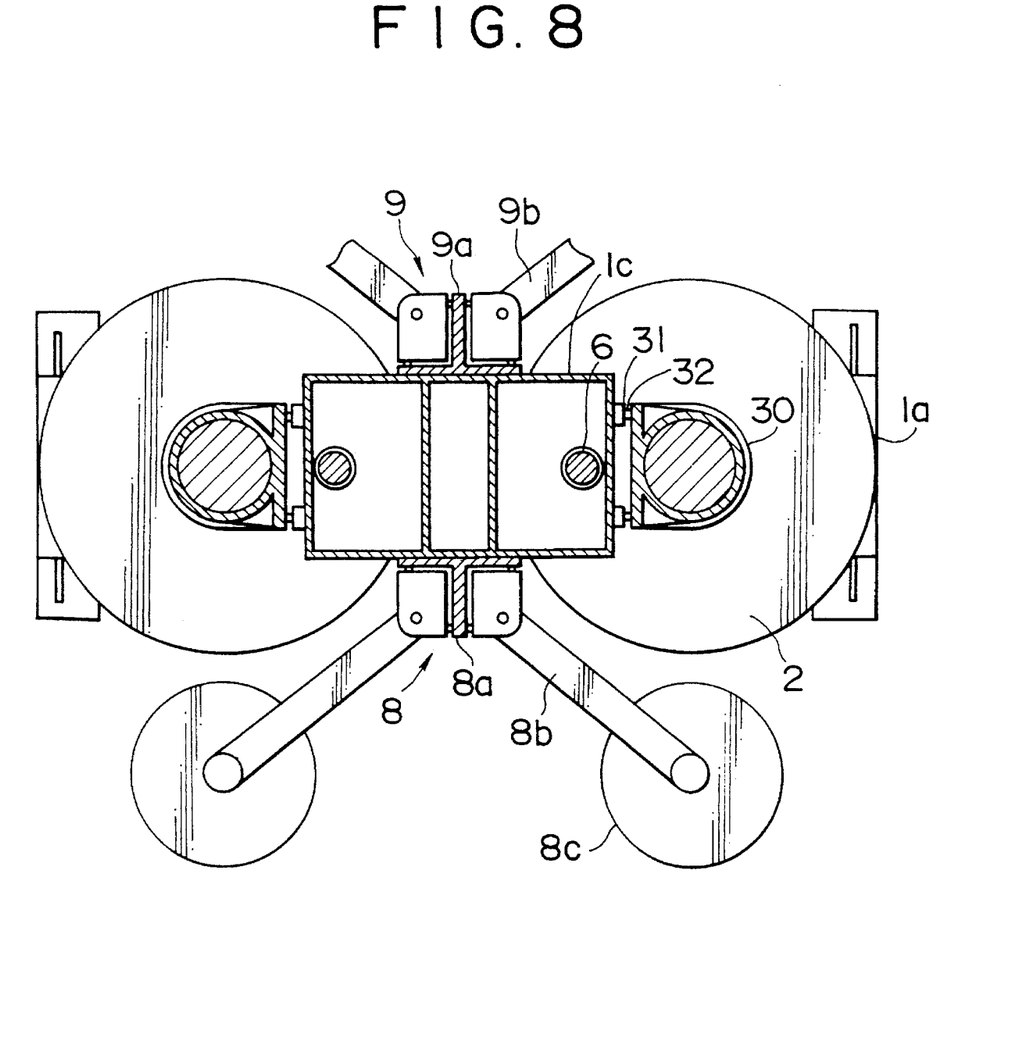
FIG. 8 is a sectional view taken along the line 8—8 of FIG. 7.
Figure 9:
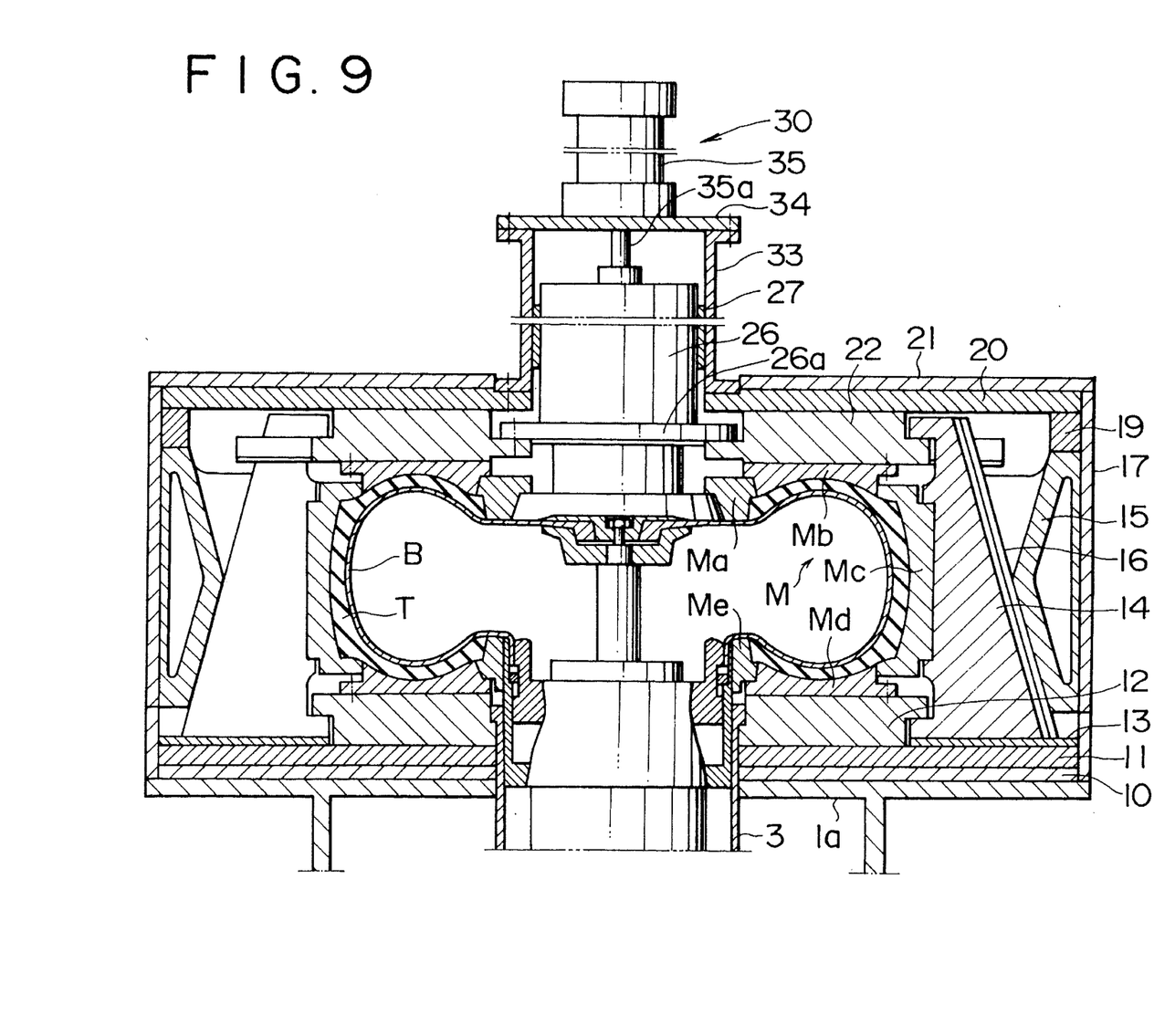
FIG. 9 is a sectional view taken along the line 9—9 of FIG. 7.

A second embodiment of a tire vulcanizing press in accordance with the present invention will be described with reference to FIGS. 7 through 9.

The same reference characters are applied to the elements in these figures which are essentially the same as the elements of the first embodiment, and only the points different from the first embodiment will be described. The first point of difference is that the upper center mechanism 30 is assembled to the beam 1c of the main frame 1 via straight track bearings 31 and rails 32 in such a manner as to be movable vertically, unlike the upper center mechanism 4 of the first embodiment. The elevating guide by means of the bracket 5 of the first embodiment may be used additionally, or the guide by means of the bracket 5 may be omitted. The second point of difference is that a cylinder 35 corresponding to the cylinder 29 of the first embodiment is installed above and outside the outer cylinder 33 of the upper center mechanism 30 via a top plate 34. The third point of difference is that the tip of the piston rod 6a of the elevating cylinder 6 is connected to the bolster plate 20. The fourth point of difference is that the actuator 23 and the pawl 24a for preventing the outer ring 15 from rising are eliminated, so that operation is carried out in the direction in which the piston rod 35a of the cylinder 35 retracts during vulcanization of tire depending on the inclination angle of the inclined sliding surface between the outer ring 15 and the segment 14.

I claim:

1. A tire vulcanizing press comprising:

a split die device having an upper disk to which an upper die portion for molding a side portion of the tire is attached and a lower disk to which a lower die portion for molding an opposing side portion of the tire is attached;

a bolster plate disposed above said upper disk;

divided opposing segments, each of which has a split tread die portion for molding a tire tread attached thereto;

an outer ring which has an inner inclined surface corresponding to an outer inclined surface of said segments, the inner inclined surface of said outer ring being slidably engaged with said outer inclined surface of said segments, wherein each of said segments has protrusions at upper and lower parts respectively, said protrusions engaging with outer peripheries of said upper and lower disks to lock said upper and lower disks together to prevent said disks from separating when the split die device is closed, and releasing a locking condition by which said upper die portion and said lower die portion are separated when the split die device is opened;

means for securing said opposing segments to said outer ring when the split die device is closed, said means for securing including an actuator mounted to a base of said split die device and having a shaft and pawl arrangement in connection therewith, and an inner peripheral groove formed in said outer ring, wherein the pawl of said actuator selectively engages with the inner peripheral groove for additionally securing said opposing segments by forcing said outer ring thereagainst when the split die device is closed;

wherein a radially directed force acting on said segments under tire vulcanizing pressure is converted into upward and downward force components due to mating of the outer inclined surface of said segments on the inner inclined surface of said outer ring; and means for resisting movement of said die portions when an internal pressure is generated within said tire vulcanizing press, said means for resisting including a lift cylinder and a center mechanism operating cylinder, said lift cylinder opposes an upward force component of said outer ring which presses against said bolster plate, and both said center mechanism operating cylinder and said lift cylinder oppose upward forces on said upper disk.

2. The tire vulcanizing press according to claim 1, wherein said outer ring is fixed to said bolster plate which is in a fixed relation to said center mechanism operating cylinder, said segments are supported by said upper disk which is in a fixed relation to a piston rod of said center mechanism operating cylinder and are slidable horizontally, and the split die device is opened and closed by means of said center mechanism operating cylinder.

3. The tire vulcanizing press according to claim 1, wherein said tire vulcanizing press includes a first and a second split die device and a column having guide rails attached thereto, the column and guide rails guiding said bolster plate mounted on the upper disk during opening of the split die devices, said column being disposed at an intermediate position between said first and second split die devices, said column additionally functioning as a column for said guide rails for a crude tire loading apparatus and a finished tire unloading apparatus.

4. A tire vulcanizing press comprising:

a split die device having an upper disk to which an upper die portion for molding a side portion of the tire is attached and a lower disk to which a lower die portion for molding an opposing side portion of the tire is attached;

divided opposing segments, each of which has a split tread die portion for molding a tire tread attached thereto;

an outer ring which has an inner inclined surface corresponding to an outer inclined surface of said segments, the inner inclined surface of said outer ring being slidably engaged with said outer inclined surface of said segments, wherein each of said segments has protrusions at upper and lower parts respectively, said protrusions engaging with outer peripheries of said upper and lower disks to lock said upper and lower disks together to prevent said disks from separating when the split die device is closed, and releasing a locking condition by which said upper die portion and said lower die portion are separated when the split die device is opened, wherein said outer ring is fixed to a bolster plate which is in a fixed relation to a center mechanism operating cylinder, said segments are supported by said upper disk which is in a fixed relation to a piston rod of said center mechanism operating cylinder and are slidable horizontally, and the split die device is opened and closed by a lift cylinder;

means for securing said opposing segments to said outer ring when the split die device is closed, said means for securing including an actuator mounted to a base of said split die device and having a shaft and pawl arrangement in connection therewith, and an inner peripheral groove formed in said outer ring, wherein the pawl of said actuator selectively engages with the inner peripheral groove for additionally securing said opposing segments by forcing said outer ring thereagainst when the split die device is closed;

wherein a radially directed force acting on said segments under tire vulcanizing pressure is converted into upward and downward components due to mating of the outer inclined surface of said segments on the inner inclined surface of said outer ring; and means for resisting movement of said die portions including said center mechanism operating cylinder and said lift cylinder which both oppose upward forces on said upper disk while said lift cylinder also opposes an upward force component on said outer ring which presses against said bolster plate.

5. The tire vulcanizing press according to claim 4, wherein said means for resisting movement of said die portions, resists the upward and downward components due to the mating of the inclined surface of said outer ring with the inclined surface of said segments.

6. The tire vulcanizing press according to claim 4, wherein said tire vulcanizing press includes a first and a second split die device and a column having guide rails attached thereto, the column and guide rails guiding said bolster plate mounted on the upper disk during opening of the split die devices, said column being disposed at an intermediate position between said first and second split die devices, said column additionally functioning as a column for said guide rails for a crude tire loading apparatus and a finished tire unloading apparatus.

* * * * *